United States Patent [19]

Pickard

[11] Patent Number: 5,174,339
[45] Date of Patent: Dec. 29, 1992

[54] FLUID FLOW CONTROL VALVE

[76] Inventor: Gerald W. Pickard, 10 Chestnut Close, The Lances, Leckhampton, Cheltenham, Gloucestershire GL53 00E, Great Britain

[21] Appl. No.: 721,445
[22] PCT Filed: Nov. 9, 1990
[86] PCT No.: PCT/GB90/01726
§ 371 Date: Aug. 8, 1991
§ 102(e) Date: Aug. 8, 1991
[87] PCT Pub. No.: WO91/07711
PCT Pub. Date: May 30, 1991

[30] Foreign Application Priority Data
Nov. 10, 1989 [GB] United Kingdom ............... 8925469

[51] Int. Cl.⁵ .................................. G05D 7/06
[52] U.S. Cl. ............................ 137/885; 137/117; 137/486; 137/503; 137/625.64
[58] Field of Search ............... 137/117, 486, 501, 503, 137/885

[56] References Cited
U.S. PATENT DOCUMENTS
3,946,757  3/1976  Wallace .................... 137/501
4,117,857 10/1978  Van De Mark ............... 137/117
4,205,592  6/1980  Haussler .................. 137/486 X
4,411,289 10/1983  Walters ................... 137/486

FOREIGN PATENT DOCUMENTS
0023416  2/1981  European Pat. Off. .
3738241  5/1989  Fed. Rep. of Germany .
 623670  6/1981  Switzerland ............... 137/117
1043980  9/1966  United Kingdom .
1085921 10/1967  United Kingdom .

Primary Examiner—Gerald A. Michalsky
Attorney, Agent, or Firm—Young & Thompson

[57] ABSTRACT

A fluid flow control valve includes a first spool member (1) the position of which controls an output fluid flow from the valve, and a control (23, MP) which controls the position of the first spool member (1), a second spool member (6), independent of the first spool member (2), is mounted in a common chamber (1) with the first spool member (6) so as to cooperate with an outlet port (15) through which the output fluid flow passes and to be movable in response to the pressure drop across the outlet port (15) so that its position is related to the output fluid flow. A feedback (22', 24) is responsive to the position of the second spool member (16) and provides an input to the control (23, MP) so that the control operates as a servo control system. The first spool member (2) includes two landed sections (3, 4) which are spaced apart with the second spool member (6) therebetween. The feedback is a mechanical feedback connection (24) to servo valve (23), and an electrical feedback signal (22') to a microprocessor (MP).

13 Claims, 2 Drawing Sheets

FLUID FLOW CONTROL VALVE

TECHNICAL FIELD

This invention relates to a fluid flow control valve, and in particular a fluid flow control valve which performs both the functions of a fluid flow metering valve and a pressure regulator.

In conventional known fluid flow control valves a simple fluid flow metering function is provided, and a separate pressure regulator is provided in conjunction therewith to provide control of the fluid flow metering function. This arrangement has the drawback of being bulky and having a relatively high weight.

DISCLOSURE OF THE INVENTION

The present invention is concerned with providing a fluid flow control valve which performs both the functions of a fluid flow metering valve and a pressure regulator.

In accordance with the present invention a fluid flow control valve comprises a first spool member the position of which controls an output fluid flow from the valve, and control means which controls the position of the first spool member, characterised in that a second spool member, independent of the first spool member, is mounted in a common chamber with the first spool member so as to cooperate with an outlet port through which said output fluid flow passes and to be moveable in response to the pressure drop across said outlet port so that its position is related to said output fluid flow, feedback means being provided which is responsive to the position of the second spool member and provides an input to said control means so that the control means operates as a servo control system.

A fluid flow control valve made in accordance with the present invention provides both the functions of a fluid flow metering valve and a pressure regulator.

Preferably, the feedback means comprises a transducer which produces an electrical output signal related to the position of the second spool member, and said control means comprises an electrohydraulic servo control valve which is controlled in accordance with said output signal from the transducer and hydraulically operates the first spool member. A signal processor is preferably provided to process the transducer output signal and produce a corresponding control signal to operate the servo valve.

In one embodiment of the invention, the feedback means comprises a strut member which is connected to the second spool member and has a bending force induced therein by movement of said second spool member which is indicative of the position of the second spool member. This strut member is provided with strain gauge means which records the strain induced in the strut and produces a feedback signal which is used to control the servo control valve. This strut member acts as a return spring on the second spool member.

The feedback means may further comprise a mechanical connection between the second spool member and the servo control valve, thereby increasing the stability of the servo control system. The mechanical connection may comprise a strut member which is connected to the second spool member and directly relays the position of the second spool member to the servo valve. This strut member is preferably of light construction and bends in transferring the feedback to the servo control valve.

In an alternative embodiment of the invention, the mechanical feedback connection may be the sole feedback means to the control means.

In another alternative embodiment of the invention, the control means that controls the position of the first spool member may be a linear motor, for example, a stepper motor.

A fluid flow control valve made in accordance with the present invention is ideally suited for use as the fuel supply control valve to an aircraft engine. This is because, in comparison with a conventional valve arrangement including a fuel metering valve and pressure regulator, the fluid flow control valve made in accordance with the present invention is smaller and lighter, whilst maintaining the accuracy of the conventional arrangement.

DESCRIPTION OF THE DRAWINGS

The invention will now be illustrated by way of description of two examples with reference to the accompanying drawings in which.

BEST MODE OF CARRYING OUT THE INVENTION

Figure 1:
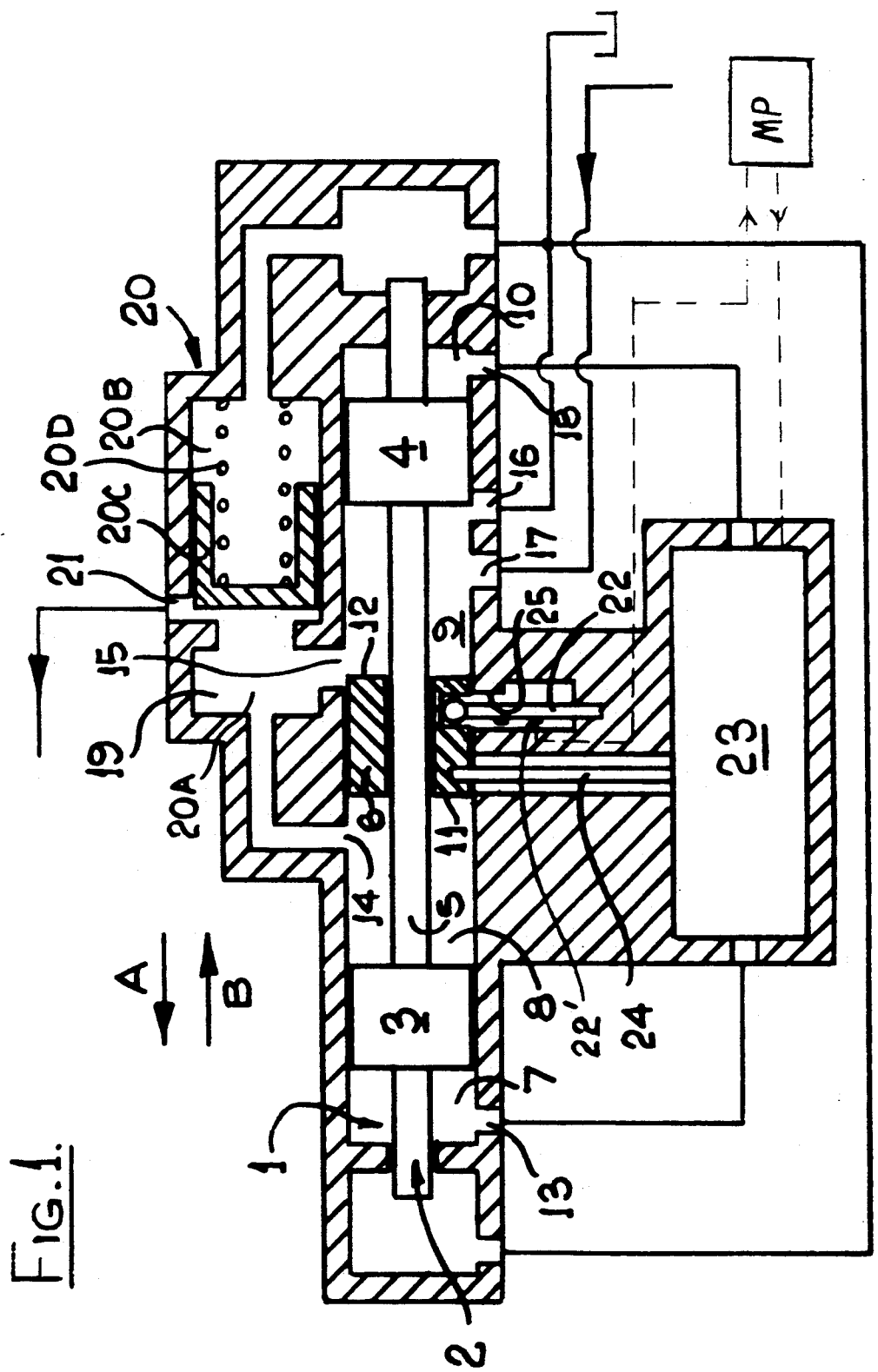
FIG. 1 shows a schematic representation of a first form of fluid flow control valve made in accordance with the present invention.

Now referring to FIG. 1 of the drawings, a first form of fluid flow control valve made in accordance with the present invention is shown, and comprises a body having a chamber 1 in which are mounted:

a first spool member 2 having two landed sections 3, 4 mounted upon a central rod member 5 which extends through and protrudes from the two landed sections 3, 4; and a second spool member 6 mounted between the two landed sections 3, 4 of the first spool member 2, and having the central rod member 5 of the first spool member 2 extending therethrough on which the second spool member 6 is freely moveable.

The first and second spool members 2, 6 divide the chamber 1 into four volumes 7, 8, 9, 10;

the first volume 7 being defined by the end wall of chamber 1 and the outer facing end wall of landed section 3 of the first spool member 2;

the second volume 8 being defined by the inner facing end of the landed section 3 of the first spool member 2 and the face 11 of the second spool member 6;

the third volume 9 is defined by the face 12 of the second spool member 6 and the inner facing end of the landed section 4 of the first spool member 2; and the fourth volume 10 is defined by the outer face of the landed section 4 of the first spool member 2 and the other end wall of the chamber 1.

The chamber 1 has six ports 13, 14, 15, 16, 17 and 18 as follows:

Port 13 which opens into the first volume 7;

Port 14 which opens into the second volume 8;

Port 15 which opens into the third volume 9 and whose extent of opening into the volume is varied by the movement of the second spool member 6;

Port 16 which opens into the third volume 9 and whose extent of opening into the volume is varied by the movement of the landed section 4 of the first spool member 2;

Port 17 which opens into the third volume; and

Port 18 which opens into the fourth volume.

The ports 14 and 15 of the chamber are connected to a secondary chamber 19 in which is mounted a minimum pressure valve 20 having an outflow port that is cut off if the pressure of fluid flowing through the valve is too low or under engine shut-down conditions when the valve is controlling the flow of fuel to an engine.

The minimum pressure valve 20 has two sides, the fluid flow side 20A and reference pressure side and comprises a piston member 20C which effects closing of the outflow port 21 and a spring member 20D which acts to force the piston member 20C towards closing of the outflow port 21. In use, the pressure of the flowing fluid through the fluid flow control valve forces the piston member 20C against the action of the spring member 20D so opening the outflow port 21 and enabling fluid flow therethrough.

A spring strut 22 is provided which extends into the chamber 1 where it is connected to the second spool member 6.

In operation, as the second spool member 6 moves within the chamber 1, a bending force is applied to the strut 22 which produces a return spring action and which is indicative of the position of the second spool member 6 in the chamber 1. Transducer means 22', such as strain gauges, are associated with the strut member 22 so as to produce an electrical signal corresponding to the value of the bending force in the strut 22, and thus the position of the second spool member 6 and the flow of fuel through the outflow port 21. This signal is relayed to control means, such as a microprocessor MP, which controls the overall operation of the control valve.

An electrohydraulic servo valve 23 under the control of the microprocessor MP, controls the position of the first spool member 2. The servo valve 23 is in communication with the first volume 7 and the fourth volume 10 of the chamber 1 and operates to vary the pressure differential between the first volume 7 and the fourth volume 10 of the chamber 1, thereby adjusting the position of the first spool member 2. In turn, this varies the flow of fluid through the control valve passing through the ports 15 and 16.

The flow of fluid through port 15 in turn produces a pressure differential which is applied via the ports 14, 15 across the second spool member 6 and causes the latter to move. A check strut member 24 connected between the second spool member 6 an the servo valve 23 has a bending force induced therein corresponding to the position of the second spool member 6 and the fluid flow through the ports 15 and 21. This bending force is relayed directly to the servo valve 23 as a mechanical feedback control.

When the fluid flow control valve is used as a fuel control valve for an engine, the valve is connected up as follows:

Port 17 to the output from a fuel pump i.e. the high pressure side of the system;

Port 16 to reservoir i.e. the low pressure side of the system; and

Outflow port 21 of the minimum pressure valve 20 to the engine.

Further, the reference pressure side 20B of the minimum pressure valve 20, and the ends of protruding sections of the central rod member 5 are also open to the fluid in the low pressure side of the system.

The strut 22 is provided with a stop member 25 against which the strut 22 engages under engine shutdown conditions. The second spool member (6) then assumes a position in which the outlet port 15 is closed to a maximum extent but not fully closed to prevent all flow of fluid through the port 15. The stop member 25 therefore acts to ensure a minimum fluid flow to the engine.

If, under control of the microprocessor MP, it is required to increase the fluid flow through the port 15, the servo valve 23 is operated to adjust the pressure balance across the first spool member 2 and cause it to move in the direction of arrow A so reducing the flow of fuel through the port 16. The flow of fuel through port 15 therefore increases, producing a pressure difference across the second spool member 6 and causing it to move in the direction of arrow A until it assumes a balanced position which is fed back to the serve valve 23 as a bending force in strut member 24.

At the same time, the transducer means 22' produces an electrical feedback signal which is fed to the microprocessor to indicate the balanced condition.

If the microprocessor requires to reduce the fluid flow through the port 15 of the fuel control valve, the reverse occurs, that is, the servo valve 23 is operated to adjust the pressure balance across the first spool member 2 and cause it to move in the direction of arrow B, increasing the flow of fluid through the port 16. The flow of fluid through the port 15 therefore reduces, and the resultant pressure difference across the second spool member 6 causes it to move in the direction of arrow B until it assumes a balanced position which is fed back via strut member 24 to the servo valve 23 and via the transducer means 22' to the microprocessor MP.

Figure 2:
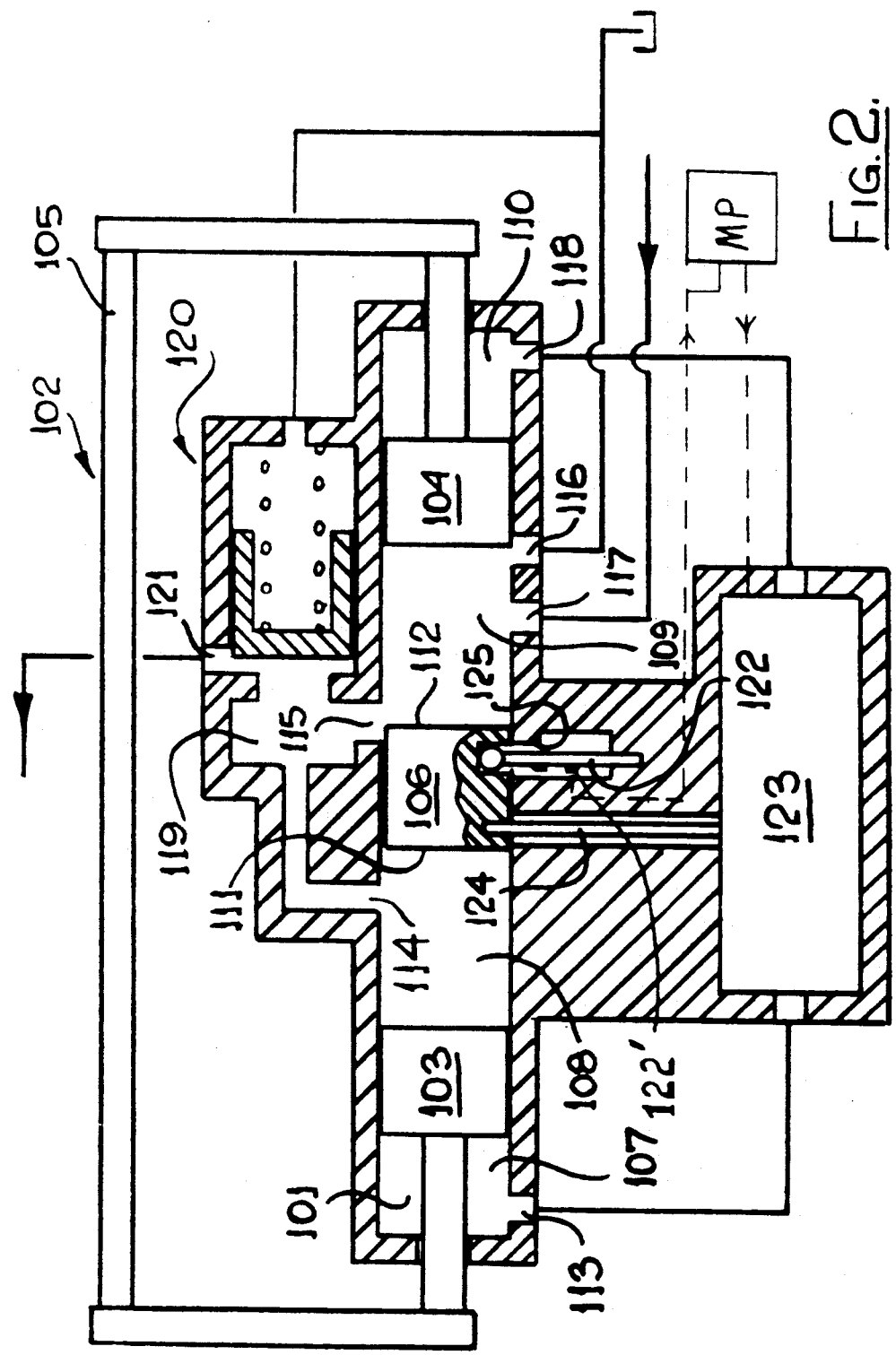
FIG. 2 shows a schematic representation of a second form of fluid flow control valve made in accordance with the present invention.

Now referring to FIG. 2 of the drawings, a second form of fluid control valve made in accordance with the present invention is shown, and comprises a body having a chamber 101 in which are mounted:

a first spool member 102 having two landed sections 103, 104 mounted one on each end of an inturned U-shaped rod member 105; and a second spool member 106 mounted between the two landed section 103, 104 of the first spool member 102.

The first and second spool members 102, 106 divide the chamber into four distinct volumes 107, 108, 109 and 110, defined as follows:

a first volume 107 defined by one end wall of the chamber and the outer face of the landed section 103 of the first spool member 102;

a second volume 108 defined by the inner face of the landed section 103 of the first spool member 102 and the face 111 of the second spool member 106;

a third volume 109 defined by the face 112 of the second spool member 106 and the inner face of the landed section 104 of the first spool member 102; and a fourth volume 110 defined by the outer face of the landed section 104 of the first spool member 102 and the other end wall of the chamber.

The chamber 101 has six ports 113, 114, 115, 116, 117 and 118 as follows:

Port 113 connected to the first volume 107;

Port 114 connected to the second volume 108;

Port 115 connected to the third volume 109, the extent of opening of which is varied by the movement of the second spool member 106;

Port 116 connected to the third volume 109, the extent of opening of which is varied by the movement of the landed section 104 of the first spool member;

Port 117 connected to the third volume 109; and

Port 118 connected to the fourth volume 110.

The ports 114 and 115 of the fluid flow control valve are connected to a secondary chamber 119 in which is mounted a minimum pressure valve 120 having an outflow port 121 that is cut off if the pressure of fluid flowing through the valve is too low. The minimum pressure valve 120 is identical in form and operation with that described with reference to FIG. 1 and the description thereof is included here by way of reference.

A strut 122 is provided which extends into the chamber 101 where it engages with the second spool member 106. The strut 122 has a number of strain gauges 122' mounted thereon. In operation, as the second spool member 106 moves within the chamber 101, a bending force is applied to the strut 122 which produces a return spring action and an electrical signal from the strain gauges corresponding to the position of the second spool member 106 in the chamber. This electrical signal from the strain gauges is relayed to an control means, such as a microprocessor MP to control the overall operation of the control valve.

A stop member 125 is also provided which prevents the second spool member 106 from completely cutting the flow of fluid through the port 115 and therefore ensures a minimum fluid flow to the engine.

A servo valve 123 under the control of the microprocessor MP control the position of the first spool member 102, the servo valve 123 being in communication with the first volume 107 and the fourth volume 110 of the chamber 101. By varying the pressure differential between the first volume 107 and the fourth volume 110 of the chamber 101, the position of the first spool member 102, is adjusted. In turn, this varies the flow of fluid through the valve passing through the ports 115 and 116.

A check strut member 124 is connected between the servo valve 123 and the second spool member 106 so as to relay a bending force directly to the servo valve which serves as a mechanical feedback control corresponding to the fluid flow through the ports 115, 116.

When the fluid flow control valve is used as a fuel control valve for an engine, the valve is connected up as follows:

Port 117 to the output from a fuel, i.e. the high pressure side of the system,

Port 116 to the reservoir, i.e. the low pressure side of the system; and

Outflow port 121 of the minimum pressure valve 120 to the engine.

The operation of the valve is identical with that described with reference to FIG. 1 of the drawings, and that description is imported herewith by way of reference.

In an alternative embodiment of the invention, one or other of the mechanical feedback control 24, 124 and the electrical feedback transducer means 22', 122' may be omitted.

I claim:

1. A fluid flow control valve comprising a first spool member the position of which controls an output fluid flow from the valve, said first spool member having two landed sections spaced apart in a chamber in said valve, control means which controls the position of the first spool member, a second spool member, independent of the first spool member, said second spool member being mounted in said chamber between the two landed sections of the first spool member so as to cooperate with an outlet port of said valve through which said output fluid flow passes and to be movable in response to a pressure drop across said outlet port so that the position of said second spool member is related to said output fluid flow, and feedback means which is responsive to the position of the second spool member and provides an input to said control means so that the control means operates as a servo control system.

2. A control valve as claimed in claim 1 in which the two landed sections are mounted on a rod (5) within said chamber (1), and said second spool member (6) is movably mounted on said rod (5).

3. A control valve as claimed in claim 1 in which said outlet port (15) opens into a portion (9) said chamber (1) between the second spool member (6) and one landed section (4) on one side of the spool member (6), and communicates via a connection (19, 14) with a portion (8) of said chamber (1) between the second spool member (6) and the other landed section (3).

4. A control valve as claimed in claim 1 in which the control means comprises an electrohydraulic servo valve (23) with hydraulic connections (13, 18) to the outer ends of the two landed sections (3, 4) so that applied hydraulic pressure controls the position of the first spool member (2).

5. A control valve as claimed in claim 4 in which the feedback means comprises a mechanical feedback connection (24) between the second spool member (6) and the servo valve (23).

6. A control valve as claimed in claim 4 in which the feedback means comprises transducer means (22') which produces an electrical signal in accordance with the position of the second spool member (6), and in which the control means (MP) responds to this electrical signal by supplying an appropriate electrical control signal to the servo valve (23).

7. A control valve as claimed in claim 6 in which the transducer means (22') is associated with a spring strut (22) which is connected to the second spool member (6) and serves to urge it to a preset position.

8. A control valve as claimed in claim 7 in which a stop (25) is provided which cooperates with the strut (22) to define an extreme position of the second spool member (6) in which the outlet port (15) is closed to a maximum extent but is not fully closed.

9. A control valve as claimed in claim 1 in which the feedback means comprises transducer means (22') which produces an electrical signal in accordance with the position of the second spool member (6), and in which the control means comprises an electrical processor (MP) which receives said electrical signal.

10. A control valve as claimed in claim 1 in which the feedback means comprises a mechanical feedback connection (24) between the second spool member (6) and the control means (23).

11. A control valve as claimed in claim 1 which includes spring means (22) that cooperates with the second spool member (6) and urges it to a preset position.

12. A control valve as claimed in claim 1 in which said chamber (1) is provided with a fluid flow input port (17) and an output spill port (16), the first spool member (4) cooperating with the output spill port (16) so as to control a spill flow of fluid from said chamber (1).

13. A control valve as claimed in claim 1 in which a minimum pressure valve (20) is provided which is responsive to the pressure of the output fluid flow from the valve and serves to cut-off the output flow if the pressure falls below a preset minimum level.

* * * * *